May 31, 1955     C. A. BARATELLI     2,709,256

EYE PROTECTIVE MEANS

Filed Jan. 5, 1952

INVENTOR
CHARLES A. BARATELLI
BY
*Louis L. Gagnon*
ATTORNEY

United States Patent Office 2,709,256
Patented May 31, 1955

2,709,256

EYE PROTECTIVE MEANS

Charles A. Baratelli, Woodstock, Conn., assignor to American Optical Company, Southbridge, Mass., a voluntary association of Massachusetts Application January 5, 1952, Serial No. 265,127

5 Claims. (Cl. 2—14)

This invention relates to improvements in eye protective devices and has particular reference to the provision of simple, inexpensive and light-weight eye protective means which is readily adaptable to various given specific uses and which will function with maximum efficiency for such uses.

One of the principal objects of the invention is to provide extremely light and comfortable eye protective means adaptable particularly to given specific uses such as under-water goggles, sun-lamp goggles, or the like where maximum efficiency as to fit and general eye protection is essential and which may be manufactured in a simple and inexpensive manner.

Another object is to provide eye protective means of the above character having shallow cup members of carefully controlled size and shape each embodying a main lens portion and integrally related rearwardly extending wall portions shaped to intimately fit the orbital brim surrounding the eye and more particularly the loose flesh beneath the brow, adjacent the inner and outer canthus and the flesh overlying the cheekbone directly beneath the eye in such manner that when in position of use the cup members are sealed with the face against the entrance of water, light, etc., whereby the eyes will be fully protected either under water or when exposed to injurious light rays as well as other known hazards.

Other objects and advantages of the invention will become apparent from the following description taken in connection with the accompanying drawings and it will be apparent that many changes may be made in the details of construction and arrangement of parts shown and described without departing from the spirit of the invention as expressed in the accompanying claims. I, therefore, do not wish to be limited to the exact details of construction and arrangement of parts shown and described as the preferred form only is given by way of illustration.

Referring to the drawings.

The device embodying the invention is intended for various given specific uses and is designed so as to be extremely light in weight, simple and inexpensive in construction and to afford maximum protection for each of said intended uses.

One use of the device is that of an under-water goggle whereby the device will have an intimate positive seal with the face and will afford maximum protection of the eyes while enabling the wearer to have clear vision under water. Another intended use is that of affording maximum protection to the eyes of the wearer when exposed to injurious light rays such, for example, as might result from the use of sun lamps, etc., and which will permit maximum exposure of the face to said light.

It is quite obvious that although specific uses are mentioned above, the device may be put to several other similar uses and all of which are intended to be within the scope of the invention.

Figure 1:
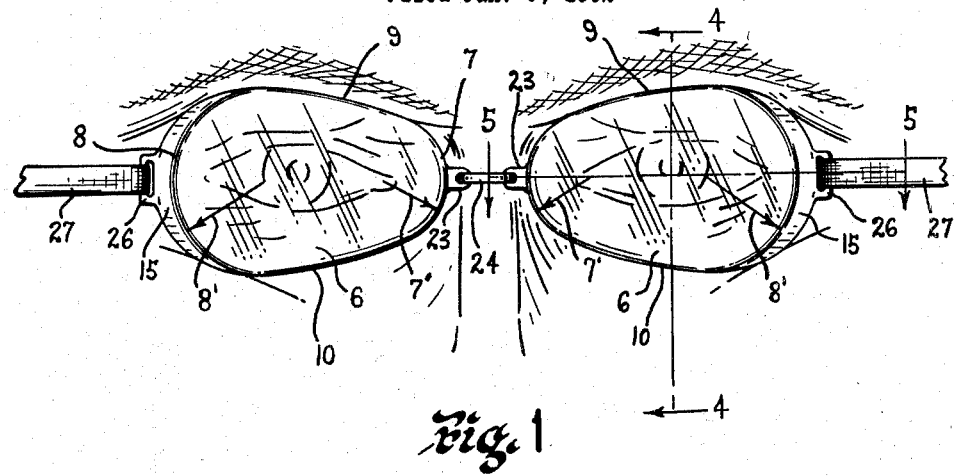
Fig. 1 is a front elevational view of the eye protective device embodying the invention diagrammatically illustrating its position of use on the face of the wearer.
Figure 4:
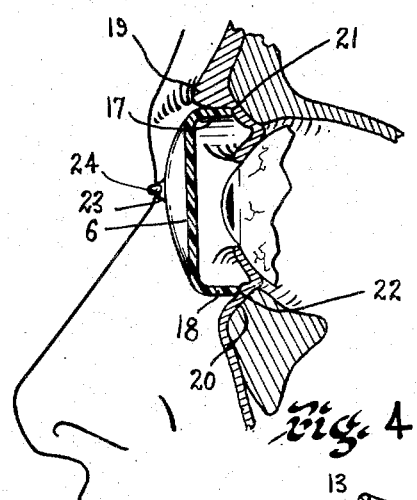
Fig. 4 is an enlarged sectional view taken as on line 4—4 of Fig. 1 and diagrammatically illustrating, in section, the fit of the eye cup member about the eye of the wearer.

Referring more particularly to the drawings wherein like characters of reference designate like parts throughout the several views, the device embodying the invention comprises a pair of eye cup members comprising main lens portions 6 which are carefully controlled as to contour shape, as illustrated in Fig. 1, to conform with the general shape of the orbital brims of the eyes and the areas adjacent the inner and outer canthi of the eyes. It is particularly pointed out that the nasal edge 7 of the lens is formed with a relatively short radius of curvature 7' while the temporal edge 8 is formed with a somewhat larger radius of curvature 8' with upper and lower edges 9 and 10 joining the respective upper and lower nasal and temporal edge portions along very shallow slightly outwardly arching long radii of curvatures whereby said edge portions are substantially accurately shaped to conform with the respective adjacent portions of the orbital brim. Each lens 6 is integrally joined with rearwardly extending wall portions having rear, upper and lower edge portions 11 which are curved to intimately fit the adjacent contours of the orbital brims of the respective eyes in edge sealed relation with the loose flesh beneath the brows and throughout the upper edge of the cheekbones, as clearly illustrated in Fig. 4. The width of the rearwardly extending wall surrounding the lens is retained at a minimum so as to position the lenses as closely as possible to the eyes of the wearer while affording ample eyelash clearance.

Figure 2:
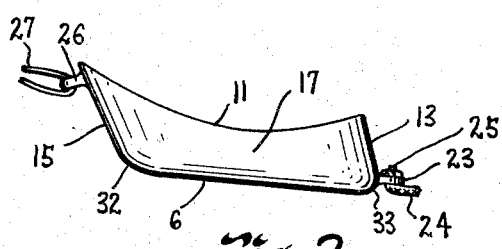
Fig. 2 is a fragmentary top plan view of one of the eye cup members of the device.
Figure 3:
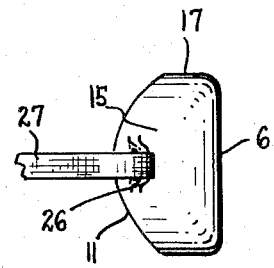
Fig. 3 is a side elevational view of the cup member illustrated in Fig. 2.
Figure 5:
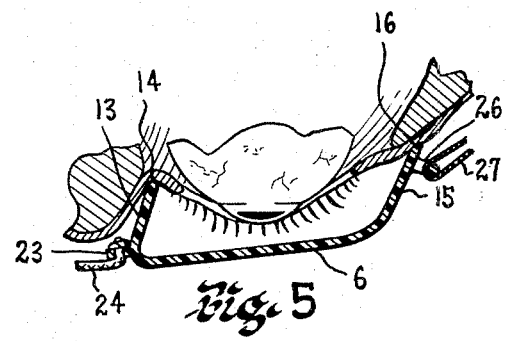
Fig. 5 is a sectional view taken as on line 5—5 of Fig. 1 further illustrating the position of use and fit of the eye cup about the eye of the wearer.

It is particularly pointed out that the nasal wall portions 13, as illustrated in Figs. 2 and 5, are angled rearwardly and inwardly with respect to the lenses so as to permit the nasal edges of the lenses to be positioned in adjacent spaced relation with each other for maximum protective central vision and to provide clearance for the nose while enabling the rear edges 14 to be intimately fitted in edge sealed relation with the loose flesh lying within the nasal canthi of the eyes. The outer temporal wall portions 15 are angled rearwardly and outwardly so as to overlie and to be intimately fitted in inner side surface sealed relation with the loose flesh adjacent the outer canthi of the eyes, as illustrated at 16 in Fig. 5.

The respective eye cup members which embody the main lens portion 6 and integrally related rearwardly extending wall portions are provided on the nasal sides thereof with integral perforated lugs 23 joined by a flexible bridge portion 24 for retaining the eye cup members in desired spaced relation with each other. The bridge portion 24 has its ends extended through the perforations in the lugs 23 and knotted, as illustrated at 25, to secure them in connected relation with said lug.

The outer temporal sides of the eye cup members are provided with integral slotted lugs 26 to which a suitable resilient headband 27 is threadedly attached.

Each eye cup member is carefully controlled as to size, shape, etc. so that they will fit in intimately sealed relation with the orbital brim of either eye whereby they may be used either as right or left eyecups by merely joining two of such cups together to form a pair.

While the size of the respective cups are carefully controlled and shaped to have an intimate sealed fit with the loose flesh surrounding the eye, their shape is also controlled so that said fit will be comfortable.

The eyecups including the lenses and integrally related wall portions are preferably formed of artificial resinous or plastic materials such as cellulose butyrate, cellulose nitrate, methyl methacrylate or other similar material, having clear transparent characteristics to afford maximum vision therethrough and the surface textures of the respective lens or shield portions 6 are carefully controlled to be of substantially ophthalmic quality. In instances when the goggles are to be used as light shields, the plastic from which the lens portions and integral wall portions are formed is preferably provided with controlled light-absorbing characteristics for absorbing and reducing the intensity of the visible rays which reach the eye. If desired, and in addition to the above characteristics, the said lenses and integral wall portions may be provided with infra-red or ultra-violet absorbing characteristics.

This may be accomplished through the use of plastics inherently having these characteristics or by adding desirable known ingredients thereto during the initial fabrication of said plastics.

While the eyecups have been described as being carefully designed to have an intimate sealed fit with the face, the bridge means 24 may be adjusted to provide the proper spacing thereof and resiliency of the headband is also adjustable through suitable means, not shown, whereby the cups will be held in desired intimately sealed relation with the face.

Figure 6:
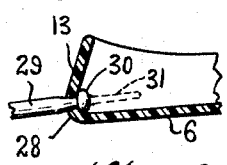
Fig. 6 is a fragmentary view similar to Fig. 5 and illustrating a modification of the invention.

In Fig. 6, there is shown a slight modification of bridge connection in which instance the nasal wall of the eyecup is provided with a perforation 28 and the bridge member 29 is formed of rubber or other similar means having an enlarged head 30 and an integral lead member 31 which may be initially placed through the opening 28 so as to pull the head 30 therethrough. After the bridge 29 has been connected with the eyecups in this manner, the lead portions 31 are removed by severing them from the enlarged head portions 30. The fact that the initial diameter of the bridge 29 is larger than the perforations, the bridge will be held in sealed relation with the cup members. It is further pointed out that the integral rearwardly extending wall portions are joined with the lens or shield portions 6 by relatively short rearwardly curving portions throughout the contours of the lenses, as illustrated at 32 and 33, with the curve 32 being of a radius slightly longer than the curve 33 on the nasal side of said lenses. The area surrounded by the edge portion 11 substantially equals that of the area of the main lens or shield portions 6 in the completed device and the temporal and nasal wall portions are in substantially parallel relation with each other while the upper and lower wall portions are also in substantially parallel relation with each other thereby causing said respective areas referred to above to be substantially equal to each other.

From the foregoing description, it will be seen that simple, light-weight, and inexpensive eye protective means has been provided for accomplishing all of the objects and advantages of the invention.

Having described my invention, I claim:

1. A device of the character described comprising a pair of relatively small non-metallic substantially rigid eyecups each having a main transparent lens portion whose peripheral contour approximates in size and shape the orbital brim of the wearer's eyes and rearwardly extending wall portions integrally related with said peripheral contour and terminating in a face-engaging edge shaped to fit with said orbital brim and in sealed relation with the flesh of the face adjacent the nasal canthus of the eye, the flesh beneath the brow, the flesh adjacent the outer canthus of the eye and the flesh overlying the upper edge of the cheekbone beneath the eye, the nasal wall portion of each eyecup being acutely angled in a direction inwardly with respect to the nasal edge of the lens portion and the temporal wall portion being obtusely angled in an outward direction with respect to the temporal edge of the lens along lines substantially parallel with each other, and said upper and lower wall portions in a direction transversely of the lens portions being substantially parallel with each other and substantially at right angles with respect to the plane of the lens, said eyecups each having an opening extending through the nasal wall thereof, a bridge member of resilient material having portions extending through said openings and enlarged end portions lying within said eyecups for resiliently retaining said eyecups in spaced relation with each other, each of said eyecups further having an integral perforated lug on the temporal side thereof and a resilient headband attached to said respective perforated lugs and adapted to retain said eyecups in sealed relation with the face when in position of use.

2. In an eye protection device of the character described, a pair of relatively shallow eyecups formed of substantially shape-retaining non-metallic material each having a shield portion the nasal end part of whose peripheral contour is turned on a short radius and the temporal end part of which is turned on a longer radius with the upper and lower parts of said peripheral contour between said end parts being of shallowest curvature and arranged in converging relation so that said shield portion approximates in size and shape the orbital brim of the wearer's eyes, said device having a continuous wall portion turned rearwardly from said peripheral contour of its shield portion and terminating in an edge shaped to fit with said orbital brim when the eyecups are in position of use over the wearer's eyes, the nasal wall portion of said eyecups being acutely angled in an inwardly disposed direction with respect to the nasal peripheral contour of the shield portion, and the temporal wall portion thereof being obtusely angled in an outward direction with respect to the temporal peripheral contour of the shield portion, the edge of said continuous wall fitting with the loose flesh of said orbital brim adjacent the nasal canthus of the eye, beneath the brow, adjacent the outer canthus of the eye and overlying the upper edge of the cheek bone beneath the eye so as to obtain a relatively effective intimate seal when in use.

3. In an eye protection device of the character described, a pair of relatively shallow eyecups formed of substantially shape-retaining non-metallic material each having a shield portion whose peripheral contour in the nasal region is turned on a short radius, in the temporal region on a longer radius with the upper and lower portions thereof between said nasal and temporal regions being of shallowest curvature and in converging relation so that said shield portion approximates in size and shape the orbital brim of the wearer's eyes, said device having a continuous wall portion turned rearwardly from said peripheral contour of its shield portion and terminating in an edge shaped to fit with said orbital brim when the eyecups are in position of use over the wearer's eyes, the nasal wall portion of said eyecups being acutely angled in an inwardly disposed direction with respect to the nasal peripheral contour of the shield portion, the temporal wall portion thereof being obtusely angled in an outward direction with respect to the temporal peripheral contour of the shield portion, and the upper and lower wall portions being disposed at substantially right angles to said shield portion, the edge of said continuous wall when in position of use on the wearer's face fitting with the loose flesh of said orbital brim adjacent the nasal canthus of the eye, beneath the brow, adjacent the outer canthus of the eye and overlying the upper edge of the cheek bone beneath the eye so as to obtain a relatively effective intimate seal.

4. An eye protective device of the character described comprising a pair of one-piece eyecups each having a shield portion whose peripheral contour is of ovular shape and approximates in size the orbital brim of the wearer's eyes, said eyecups each having a continuous wall integrally related with the peripheral contour of its shield portion, said continuous wall extending rearwardly thereof and terminating in a face-engaging edge shaped to fit with said orbital brim and in sealed relation with the loose flesh of the face adjacent the nasal canthus of the eye, beneath the brow, adjacent the outer canthus of the eye and overlying the upper edge of the cheekbone beneath the eye, the nasal portion of said continuous wall being of general cylindrical shape and actutely angled in an inward direction with respect to the nasal peripheral contour of the shield portion and the temporal portion of said wall being of general cylindrical shape and obtusely angled in an outward direction with respect to the temporal peripheral contour of said shield portion, said nasal and temporal cylindrical shaped portions of the wall extending in directions substantially parallel with each other altho curved toward each other, and the intermediate upper and lower portions of said wall between said nasal and temporal portions being disposed at substantially right angles with respect to the plane of said shield portion of the eyecups, bridge means connecting the nasal sides of said eyecups and means adjacent their temporal sides by which means may be attached to said eyecups for supporting the device on the face of the wearer.

5. An eye protective device of the character described comprising a pair of relatively small shallow one-piece eyecups each having a main transparent shield whose peripheral contour is of ovular shape and approximates in size the orbital brim of the wearer's eyes, said eyecups having a continuous wall integrally related with the peripheral contour of said shield, said continuous wall extending rearwardly thereof and terminating in a face-engaging edge shaped to fit with said orbital brim and in sealed relation with the loose flesh of the face adjacent the nasal canthus of the eye, beneath the brow, adjacent the outer canthus of the eye and overlying the upper edge of the cheekbone beneath the eye, the nasal portion of said continuous wall being of generally cylindrical shape and acutely angled in an inward direction with respect to the nasal peripheral contour of said shield, the temporal portion of said wall being of generally cylindrical shape and obtusely angled in an outward direction with respect to the temporal peripheral contour of the shield, said nasal and temporal cylindrically shaped portions of the wall extending in directions substantially parallel with each other altho curved toward each other, and the intermediate upper and lower portions of said wall between the nasal and temporal portions thereof being disposed at substantially right angles with respect to the plane of said shield, said eyecups having perforated portions adjacent their nasal sides through which the ends of bridge means are threaded and secured to the eyecups, and means adjacent the temporal sides of said eyecups to which holding means are attached for supporting the device on the face of the wearer.

References Cited in the file of this patent

UNITED STATES PATENTS

| 1,168,581 | Troppman | Jan. 18, 1916 |
| 2,007,186 | Farrell | July 9, 1935 |

FOREIGN PATENTS

| 650,350 | Germany | Sept. 22, 1937 |